US011176510B2

United States Patent
Beasley et al.

(10) Patent No.: US 11,176,510 B2
(45) Date of Patent: Nov. 16, 2021

(54) CARGO TRANSPORT SYSTEM FOR PERISHABLE PRODUCTS

(71) Applicant: CARRIER CORPORATION, Palm Beach Gardens, FL (US)

(72) Inventors: Marc Beasley, Beverly, MA (US); Jeffrey Allen Leshuk, Davis, CA (US); Mark E. Cywilko, Jamesville, NY (US); Murat Yasar, West Hartford, CT (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 531 days.

(21) Appl. No.: 16/086,220

(22) PCT Filed: Mar. 16, 2017

(86) PCT No.: PCT/US2017/022716
§ 371 (c)(1),
(2) Date: Sep. 18, 2018

(87) PCT Pub. No.: WO2017/161123
PCT Pub. Date: Sep. 21, 2017

(65) Prior Publication Data
US 2020/0293984 A1    Sep. 17, 2020

Related U.S. Application Data

(60) Provisional application No. 62/310,199, filed on Mar. 18, 2016.

(51) Int. Cl.
*G06Q 10/08* (2012.01)
*H04W 4/35* (2018.01)
(Continued)

(52) U.S. Cl.
CPC ......... *G06Q 10/0832* (2013.01); *A23B 7/152* (2013.01); *A23L 3/3418* (2013.01);
(Continued)

(58) Field of Classification Search
CPC ... A23B 7/152; A23L 3/3418; F25D 2700/16; F25D 29/003; H04W 4/35
See application file for complete search history.

(56) References Cited

U.S. PATENT DOCUMENTS 4,003,728 A    1/1977  Rath
4,987,745 A *  1/1991  Harris ................... A23L 3/3418
                                                      62/78
(Continued)

FOREIGN PATENT DOCUMENTS

CN    102918552 A    2/2013
DE    10060629 A1    6/2002
(Continued)

OTHER PUBLICATIONS

ISR/WO, dated May 10, 2017, 11 pages.
(Continued)

*Primary Examiner* — Henry T Crenshaw
(74) *Attorney, Agent, or Firm* — Cantor Colburn LLP

(57) ABSTRACT

A cargo transport system includes a container for storing perishable products, and a control assembly for controlling an environment parameter. A sensor of the system is configured to measure the environment parameter. A detector of the system may be directly secured to the perishable products for measuring a product condition. A control module of the system is configured to receive signals from the sensor and the detector indicative of the measured environment parameter and product condition, process the signals, and send a command signal to the control assembly for adjusting the environment parameter.

16 Claims, 3 Drawing Sheets

(51) Int. Cl.
*A23B 7/152* (2006.01)
*A23L 3/3418* (2006.01)
*F25D 29/00* (2006.01)

(52) U.S. Cl.
CPC ............ *F25D 29/003* (2013.01); *H04W 4/35* (2018.02); *F25D 2700/16* (2013.01)

(56) References Cited

U.S. PATENT DOCUMENTS

| | | | |
|---|---|---|---|
| 5,099,654 A * | 3/1992 | Baruschke | B60H 1/3208 |
| | | | 62/180 |
| 5,285,652 A * | 2/1994 | Day | F25B 5/04 |
| | | | 62/199 |
| 5,609,096 A | 3/1997 | Kwon et al. | |
| 5,771,790 A * | 6/1998 | Barrows | A23B 7/144 |
| | | | 211/113 |
| 5,897,207 A | 4/1999 | Hartmann | |
| 6,378,315 B1 * | 4/2002 | Gelber | G05D 23/1905 |
| | | | 62/80 |
| 7,209,042 B2 | 4/2007 | Martin et al. | |
| 7,327,260 B2 | 2/2008 | Himberger et al. | |
| 7,937,244 B2 | 5/2011 | Kadaba | |
| 8,321,302 B2 | 11/2012 | Bauer et al. | |
| 9,016,564 B2 | 4/2015 | Kim et al. | |
| 9,030,295 B2 | 5/2015 | Allen | |
| 9,087,333 B2 | 7/2015 | Kim | |
| 9,218,585 B2 | 12/2015 | Gupta | |
| 9,889,724 B2 | 2/2018 | Chen et al. | |
| 2011/0029413 A1 | 2/2011 | Ben-Tzur et al. | |
| 2011/0301762 A1 * | 12/2011 | Walker | F25D 29/003 |
| | | | 700/275 |
| 2015/0002299 A1 | 1/2015 | Sandvick | |
| 2017/0079296 A1 * | 3/2017 | Luo | A23B 7/152 |
| 2017/0127705 A1 * | 5/2017 | Cermak | A23L 3/3418 |
| 2020/0293984 A1 * | 9/2020 | Beasley | G06Q 10/0832 |

FOREIGN PATENT DOCUMENTS

| | | |
|---|---|---|
| DE | 102012018357 A1 | 3/2014 |
| DE | 102014006650 A1 | 11/2015 |
| EP | 0 565 925 * | 10/1993 |
| EP | 0565925 A1 | 10/1993 |
| EP | 1510769 A1 | 3/2005 |
| EP | 2105688 A2 | 9/2009 |
| JP | 02082079 | 3/1990 |
| JP | 2003054751 A | 2/2003 |
| JP | 2005-280909 * | 10/2005 |
| JP | 2005280909 A | 10/2005 |
| JP | 2008094616 A | 4/2008 |
| JP | 2015013704 A | 1/2015 |
| KR | 20090059616 A | 6/2009 |
| KR | 20120113202 A | 10/2012 |
| WO | 2006087747 A1 | 8/2006 |
| WO | 2009073034 A1 | 6/2009 |

OTHER PUBLICATIONS

Monai Krairiksh, Jatuphong Varith, Apichan Kanjanavapastit, "Wireless Sensor Network for Monitoring Maturity Stage of Fruit," 2011. pp. 318-321.

Reiner Jedermann, "Results of the project Intelligent Container", Institute for Microsensors-, actuators and -systems (IMSAS), May 2014. pp. 1-20.

Reiner Jedermann, Luis Ruiz-Garcia, Walter Lang, "Spatial temperature profiling by semi-passive RFID loggers for perishable food transportation," 2009. pp. 145-154.

Silvia Estrada-Flores, "RFID Technologies for Cold Chain Applications," Sep. 2008. pp. 1-4.

Chinese Office Action for Chinese Application No. 201780030604.2; dated Apr. 23, 2020; 8 Pages.

Translation of Chinese Office Action for Chinese Application No. 201780030604.2; dated Apr. 23, 2020; 4 Pages.

Communication from the European Patent Office for European Application No. 17716336.7; dated Oct. 26, 2020; 6 Pages.

Japanese Office Action for Japanese Application No. 2018-549256; dated Mar. 2, 2021; 12 Pages.

* cited by examiner

CARGO TRANSPORT SYSTEM FOR PERISHABLE PRODUCTS

CROSS-REFERENCE TO RELATED APPLICATIONS

This application claims the benefit of PCT/US2017/022716 filed Mar. 16, 2017, which claims priority to U.S. Provisional Application No. 62/310,199 filed Mar. 18, 2016, which is incorporated herein by reference in its entirety.

BACKGROUND

The present disclosure relates to a cargo transport system, and more particularly, to a system configured to monitor a perishable product condition and thereby control at least one environment parameter.

Traditional cargo transport systems may monitor and collect environment parameter data such as temperature, humidity and ethylene concentrations during refrigerated transportation. The collected parameter data may be used to infer a condition of the perishable product in a very general manner. Typically, conclusions drawn from such data is speculative and that the product may have suffered due to sub-optimal environment parameters. Improvements concerning the information available during transportation of perishable products is desirable.

SUMMARY

A cargo transport system for storing and transporting perishable products according to one, non-limiting, embodiment of the present disclosure includes a container defining a space for transporting the perishable products; a control assembly constructed and arranged to control an environment parameter of the space; a sensor configured to measure the environment parameter and send a parameter signal indicative of an environment parameter measurement; a detector constructed and arranged to be directly secured to the perishable products for measuring a condition of the perishable products, and configured to send a condition signal indicative of the condition; and a control module configured to receive and process the condition and parameter signals and send a command signal to the control assembly for adjusting the environment parameter.

Additionally to the foregoing embodiment, the condition signal is a wireless signal sent via a transmitter circuit of the detector and received by a receiver circuit of the control module.

In the alternative or additionally thereto, in the foregoing embodiment, the control module includes a computer-based processor and a computer readable and writeable storage medium and is configured to execute an algorithm utilizing at least one of the parameter signal and the condition signal to establish the command signal.

In the alternative or additionally thereto, in the foregoing embodiment, the parameter signal is utilized by the algorithm and the condition signal is stored by the storage medium for future reference.

In the alternative or additionally thereto, in the foregoing embodiment, the condition signal is utilized by the algorithm and the parameter signal is utilized directly by the control assembly.

In the alternative or additionally thereto, in the foregoing embodiment, the control assembly includes a refrigeration unit and the environment parameter includes temperature.

In the alternative or additionally thereto, in the foregoing embodiment, the control assembly includes an air exchange unit.

In the alternative or additionally thereto, in the foregoing embodiment, the environment parameter is ethylene concentration.

In the alternative or additionally thereto, in the foregoing embodiment, the control assembly includes an environment composition control unit and the environment parameter is a molecular composition.

In the alternative or additionally thereto, in the foregoing embodiment, the molecular composition is a percentage of oxygen.

In the alternative or additionally thereto, in the foregoing embodiment, the molecular composition is a concentration of carbon dioxide.

In the alternative or additionally thereto, in the foregoing embodiment, the molecular composition is a concentration of an inert gas.

In the alternative or additionally thereto, in the foregoing embodiment, the molecular composition is a concentration of ethylene.

In the alternative or additionally thereto, in the foregoing embodiment, the condition is color.

In the alternative or additionally thereto, in the foregoing embodiment, the condition is firmness.

In the alternative or additionally thereto, in the foregoing embodiment, the condition is temperature.

A method of operating a cargo transport system according to another, non-limiting, embodiment includes measuring a condition of a perishable product by a condition detector secured directly to a perishable product; measuring an environment parameter of containment air by a parameter sensor; sending a wireless condition signal indicative of the condition to a control module by the detector; sending a parameter signal indicative of the measured environment parameter to the control module by the sensor; executing an algorithm by the control module utilizing the measured condition to determine a target environment parameter; sending a command signal to an environmental control assembly indicative of the measured environment parameter and the target environment parameter; and initializing the environmental control assembly to reach the target environment parameter.

Additionally to the foregoing embodiment, the measured environment parameter is a function of the algorithm.

In the alternative or additionally thereto, in the foregoing embodiment, the measured environment parameter is sent to the environmental control assembly.

The foregoing features and elements may be combined in various combinations without exclusivity, unless expressly indicated otherwise. These features and elements as well as the operation thereof will become more apparent in light of the following description and the accompanying drawings. However, it should be understood that the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
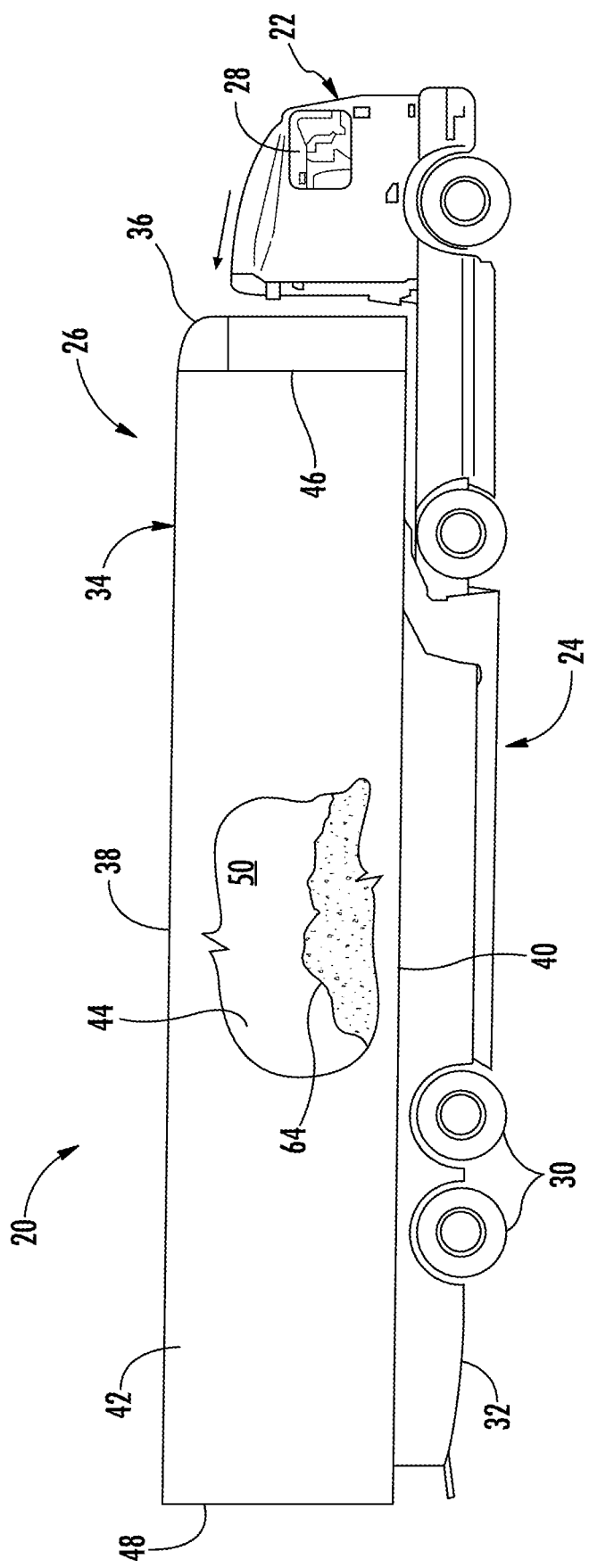
FIG. 1 is a side view of a tractor trailer system as one, non-limiting, application of a cargo transport system of the present disclosure.

Referring to FIG. 1, one, non-limiting, application for a transport containment assembly of the present disclosure is illustrated as a tractor trailer system 20. The tractor trailer system 20 may include a tractor 22, a trailer 24 and a cargo transport system 26 utilized to control environmental parameters. The tractor 22 may include an operator's compartment or cab 28 and an engine (not shown) which is part of the powertrain or drive system of the tractor 22. The trailer 24 may include a plurality of wheels 30 rotationally engaged to a frame or platform 32 that may be detachably coupled to the tractor 22. The frame 32 is constructed to support the cargo transport system 26 for ground transport to desired destinations. The cargo transport system 26 may be an integral part of the frame 32, or, may be constructed for removal from the frame. It is contemplated and understood that the transport containment assembly 26 may be constructed for other types of transportation other than tractor trailer systems and/or may be adapted for use in multiple types of transportation (e.g., ground, sea, and/or air).

Figure 2:
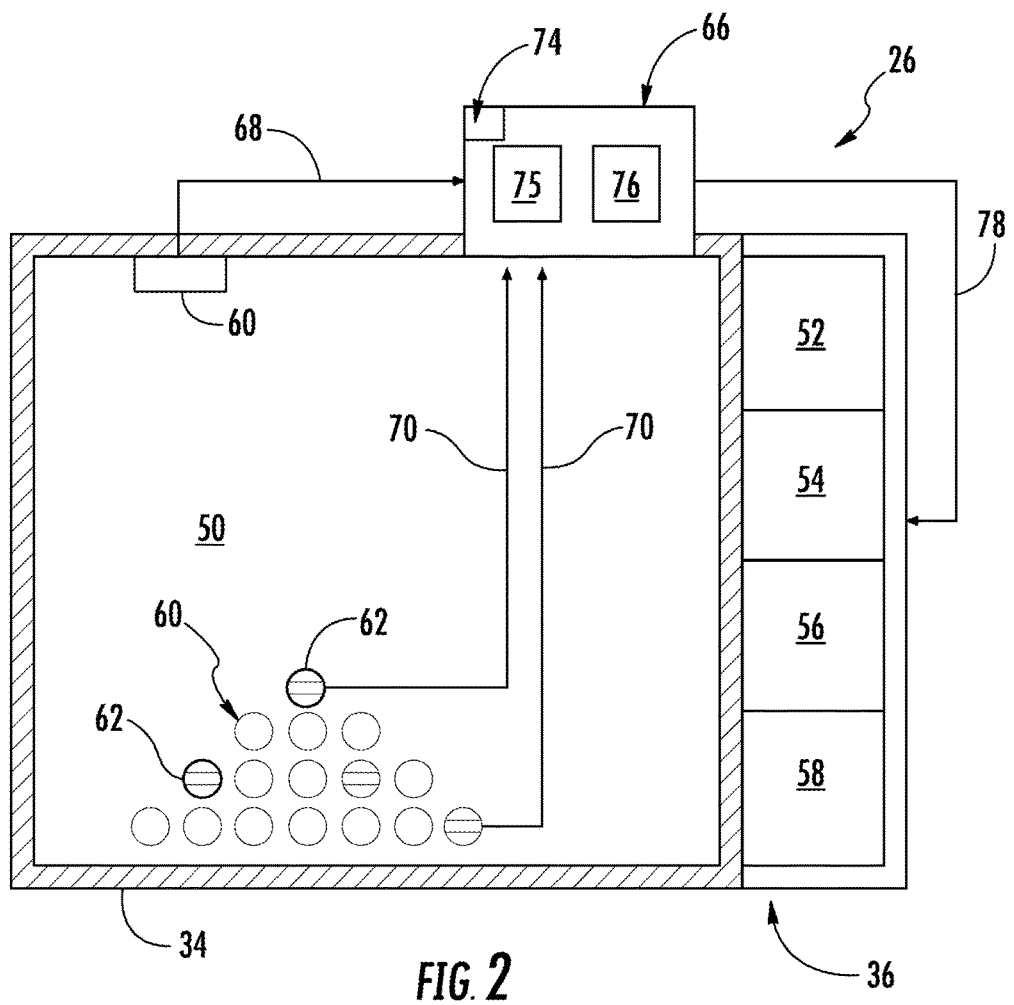
FIG. 2 is a schematic of the cargo transport system.

Referring to FIGS. 1 and 2, the cargo transport system 26 may include a container 34 and an environmental control assembly 36. The container 34 may include top, bottom, two sides, front and rear walls 38, 40, 42, 44, 46, 48 (also see FIG. 2) that together define the boundaries of a cargo compartment or space 50. The environmental control assembly 36 may be an integral part of the container 34 and may be located at or near the front wall 46. The environmental control assembly 36 facilitates the control of environmental parameters within the cargo compartment 50. The container 34 may further include doors (not shown) at the rear wall 48, or any other wall. It is contemplated and understood that the container 34 may be any shape and, in some applications, may not be completely enclosed (e.g., no top wall 38 and/or no side walls 42, 44, etc.).

Depending upon the environment parameter being controlled, the environmental control assembly 36 may include a refrigeration unit 52, a humidity control unit 54, an air exchange unit 56, and an environment composition control unit 58. Although illustrated separately, it is understood that any two or more of the units 52, 54, 56, 58 may generally be integrated together thereby sharing various components to achieve an end goal of controlling one or more environment parameters. For example, an environment parameter may be temperature controlled by the refrigeration unit 52. An environment parameter may be humidity controlled by the humidity control unit 54. However and depending upon outside conditions, the humidity and/or temperature may be controlled by the exchange of air accomplished via the air exchange unit 56. Another environment parameter may be a molecular composition of the air in the compartment 50. If the air composition is undesirable, it may be resolved via the environment composition control unit 58 that may, as one example, include a membrane gas generator, compressed bottle gases or may use the respiration rate of the transported product to to modify the atmosphere in compartment 50. Depending upon the cargo, the compressed or generated gas may be an inert gas such as nitrogen. Alternatively, the compressed gas may be oxygen, carbon dioxide, ethylene or ozone. Other examples of environment parameters that may be controlled by addition, dilution, venting or scrubbing include oxygen concentration, carbon dioxide concentration, ethylene concentration, ozone concentration and 1-Methylcyclopropene (1-MCP) concentration.

The cargo transport system 26 may further include at least one sensor 60 for monitoring and/or measuring at least one environment parameter, at least one detector 62 directly secured to the cargo 64, which may be perishable products, for monitoring and/or measuring a condition of the perishable products, and a control module 66 configured to receive signals (see arrows 68 and 70) from the respective sensor 60 and detector 62. The control module 66 may be configured to process the signals 68, 70 and send an associated command signal 72 to the environmental control assembly 36 to preserve a condition (e.g., freshness) of the perishable products 64, and/or limit further degradation of the perishable products 64.

The sensor 60 may be located in the containment 50 for generally measuring an environment parameter of the air in the containment which generally surrounds the perishable products 64. The sensor 60 may be any variety of sensors depending upon the parameters of concern which may be dictated by the perishable products 64 being transported. For example, the at least one sensor 60 may be any one or more of a humidity sensor, a chemical sensor, a temperature sensor, oxygen sensor, carbon dioxide sensor, light sensor, ethylene sensor, ozone sensor, and sensors for other volatile organic compounds. More specifically, if the environment parameter is temperature, then the sensor 60 may be a temperature sensor. If the environment parameter is molecular composition, then the sensor 60 may be a chemical sensor, and if the environment parameter is humidity, then the sensor 60 may be a humidity sensor. The signal 68 generated by the sensor 60 may be transmitted over a wired or wireless pathway. For example, if the control module 66 is secured to the container 34 (i.e., travels with the container), the sensor 60 may utilize a wired pathway. If the control module 66 is remotely located (e.g., in the cab 28 or otherwise at a land-based location), the sensor 60 may utilize a wireless pathway.

Figure 3:
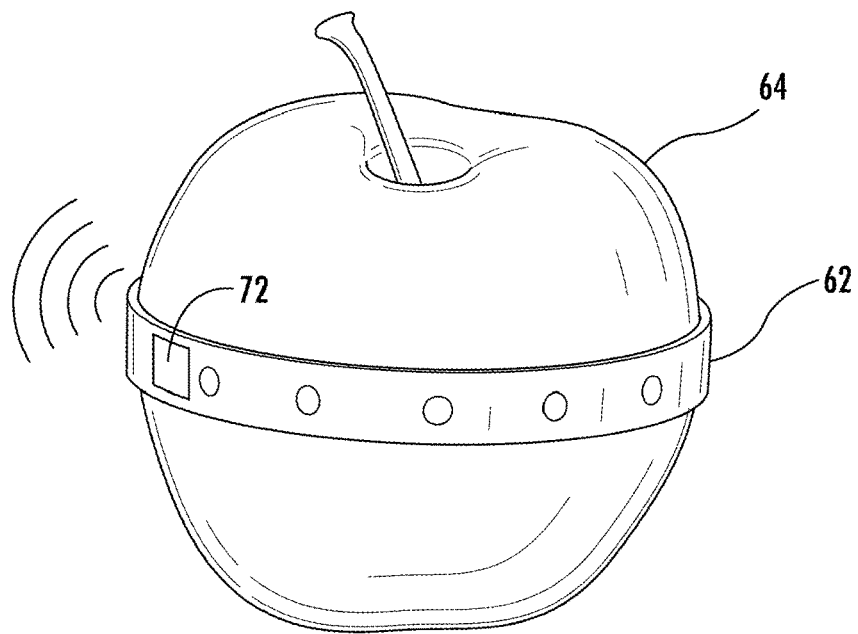
FIG. 3 is a perspective view of a detector of the cargo transport system secured to a perishable product.

Referring to FIGS. 2 and 3, the detector 62 is secured directly to what may be a random selection of perishable products 64. Non-limiting examples of perishable products may be any type of vegetable, fruit, meats, and others. The detectors 62 are attached directly to the perishable products to make direct, objective measurements of key condition attributes. Such measurements may include as non-limiting examples: color, firmness and compositional changes, emitted gases via respiration, and/or others. Detector types may include imaging (i.e., camera), color, firmness, temperature, chemical, and others. For example, if the product composition of concern is firmness, the detector 62 may be a type of thin-film strain gauge that may further be part of a resiliently stretchable band that wraps about the perishable product 64 (see apple example in FIG. 3). Other examples of detectors 62 may include a radio frequency identification tag (RFID) with onboard gas sensing capability, and others.

In one example, the perishable product 64 may be apples. Environment parameters that may be controlled to preserve apples may include humidity, temperature, oxygen concentration, carbon dioxide concentration and ethylene. To preserve apples and delay the ripening process, the containment 50 may be kept at low oxygen levels of about one percent, at carbon dioxide levels of between one and five percent, at low temperatures of about zero degrees centigrade, at high humidity of about ninety to ninety-five percent, and/or at an ethylene concentration range of about one to four-hundred parts per million.

The control module 66 may be attached to the container 34, located remotely but traveling with the container 34, or may be, for example, part of a cloud server application. The detector 62 may include a transmitter circuit 72 configured to send the signals 70 over wireless pathways, wherein the signals may be radio frequency (RF) signals. The control module 66 may include a receiver circuit 74 configured to receive the wireless signals 70. The signals 70 sent by the detectors 62 may be sent over wireless pathways. The detectors 62 may be powered by any variety of ways known in the art. It is further contemplated and understood that the circuits 72, 74 may be transceiver circuits enabling the control module 66 to turn on and turn off the detectors intermittently to, for example, conserve detector power.

The control module 66 may include a computer-based processor 75 and a computer readable and writeable storage medium 76. The storage medium 76 may store algorithms executed by the processor 75, may store detector and sensor data accumulated during transit of a particular cargo, and may further store data tables specific to the cargo being transported. For example, if the perishable products 64 are bananas, the 'banana' data table may include desired environment parameter ranges needed to manage banana ripening. Such data may include temperature, humidity, and the presence of certain gases (e.g., carbon dioxide and ethylene) which are produced during the ripening process.

Applying the relevant data tables, the processor 75 once receiving the parameter and/or condition signals 68, 70 may execute the associated algorithms to generate appropriate command signals 78 that are sent to the environmental control assembly 36. The environmental control assembly 36 may then initiate the appropriate unit(s) 52, 54, 56, 58 to adjust the measured environment parameter of the containment air. It is contemplated and understood that the measured environment parameter and the measured product condition may be functions of the algorithm.

In another example, the measured product condition may be a function of the algorithm and the measured environment parameter is used to directly control the environmental control assembly 36. That is, combinations of 'targeted' environment parameters may be based on current conditions and needs of the perishable product 64 and would affect the product in various manners including slowing or accelerating ripening, inhibiting post-harvest plant pathogen growth, inhibiting water loss, inhibiting or promoting color change, and/or adjusting to changes in chilling sensitivity. It is understood that the term 'targeted' environment parameter is that parameter calculated by the control module 66 based on real-time conditions of the product. Via the command signal 78, it is the goal of the environmental control assembly 36 to adjust toward or obtain the parameter value. It is further contemplated and understood that this process may conserve energy since the environmental control assembly 36 may operate in real-time and consume energy only when needed (i.e., current needs).

In another example, the ripeness of a banana may be controlled by controlling the temperature of the containment 50, and by controlling the fresh air exchange or gas scrubbing devices to regulate the amount of carbon dioxide and ethylene present in the containment air. The degree of ripeness may be determined and recorded by measuring the concentration of the gasses produced by the banana and found in the containment air. In this example, data from the sensor 60 may be used and applied in the algorithm executed by the processor 75 then appropriately adjusted and controlled via the environmental control assembly 36 as dictated by the command signal 78 of the control module 66.

Figure 4:
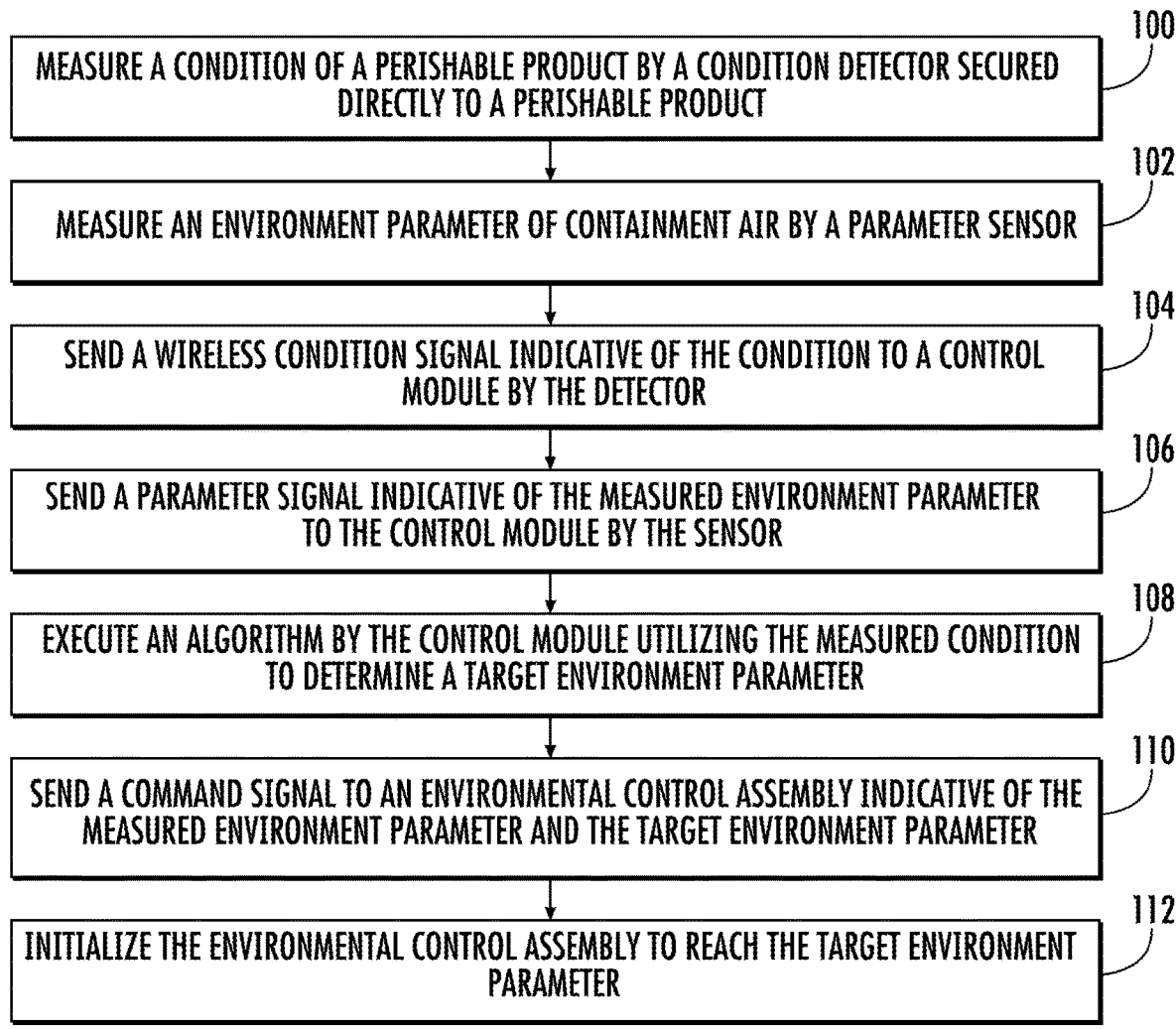
FIG. 4 is a flow chart of a method of operating the cargo transport system.

Referring to FIG. 4, a method of operating the cargo transport system 26 includes a first block 100 of measuring a condition of a perishable product 64. A block 102 entails measuring an environment parameter of containment air by a parameter sensor 60. Block 104 entails sending a wireless condition signal 70 that is indicative of the measured condition to a control module 66 by the detector 62. Block 106 entails sending a parameter signal 68 indicative of the measured environment parameter to the control module 66 by the sensor 60. Block 108 entails executing an algorithm by the control module 66 utilizing the measured condition to determine a target environment parameter. Block 110 entails sending a command signal 78 to an environmental control assembly 36 indicative of the measured environment parameter and the target environment parameter. Block 112 entails initializing the environmental control assembly to reach the target environment parameter.

Benefits and advantages of the present disclosure include an objective assessment of actual perishable product condition over a time span during, for example, transportation. Other advantages include a real-time feedback to the refrigeration unit, an intelligent manipulation of environmental parameters to optimize the condition of the perishable products upon arrival, minimize wear on the TRU, and optimizing energy efficiency. Yet further, because current conditions of the perishable product is known during transit, real-time technical, operational and commercial decision making can be achieved.

While the present disclosure is described with reference to illustrated embodiments, it will be understood by those skilled in the art that various changes may be made and equivalents may be substituted without departing from the spirit and scope of the present disclosure. In addition, various modifications may be applied to adapt the teachings of the present disclosure to particular situations, applications, and/or materials, without departing from the essential scope thereof. The present disclosure is thus not limited to the particular examples disclosed herein, but includes all embodiments falling within the scope of the appended claims.

What is claimed is:
1. A cargo transport system for storing and transporting perishable products, the cargo transport system comprising:
   a container defining a space for transporting the perishable products;
   a control assembly constructed and arranged to control an environment parameter of the space;
   a sensor configured to measure the environment parameter and send a parameter signal indicative of an environment parameter measurement;
   a detector constructed and arranged to be directly secured to the perishable products for measuring a condition of the perishable products, and configured to send a condition signal indicative of the condition; and
   a control module configured to receive and process the condition and parameter signals and send a command signal to the control assembly for adjusting the environment parameter, wherein the environment parameter and the condition are of different types, and wherein the control module includes a computer-based processor and a computer readable and writeable storage medium and is configured to execute an algorithm utilizing both the parameter signal and the condition signal to establish the command signal.

2. The cargo transport system set forth in claim 1, wherein the condition signal is a wireless signal sent via a transmitter circuit of the detector and received by a receiver circuit of the control module.

3. The cargo transport system set forth in claim 2, wherein the control module includes a computer-based processor and a computer readable and writeable storage medium and is configured to execute an algorithm utilizing at least one of the parameter signal and the condition signal to establish the command signal.

4. The cargo transport system set forth in claim 3, wherein the parameter signal is utilized by the algorithm and the condition signal is stored by the storage medium for future reference.

5. The cargo transport system set forth in claim 3, wherein the condition signal is utilized by the algorithm and the parameter signal is utilized directly by the control assembly.

6. The cargo transport system set forth in claim 2, wherein the control assembly includes a refrigeration unit and the environment parameter includes temperature.

7. The cargo transport system set forth in claim 2, wherein the control assembly includes an air exchange unit.

8. The cargo transport system set forth in claim 7, wherein the environment parameter is ethylene concentration.

9. The cargo transport system set forth in claim 2, wherein the control assembly includes an environment composition control unit and the environment parameter is a molecular composition.

10. The cargo transport system set forth in claim 9, wherein the molecular composition is a percentage of oxygen.

11. The cargo transport system set forth in claim 9, wherein the molecular composition is a concentration of carbon dioxide.

12. The cargo transport system set forth in claim 9, wherein the molecular composition is a concentration of an inert gas.

13. The cargo transport system set forth in claim 9, wherein the molecular composition is a concentration of ethylene.

14. The cargo transport system set forth in claim 2, wherein the condition is color.

15. The cargo transport system set forth in claim 2, wherein the condition is firmness.

16. The cargo transport system set forth in claim 2, wherein the condition is temperature.

* * * * *